Sept. 12, 1933. L. D. SOUBIER 1,926,410
APPARATUS FOR MAKING TUBULAR GLASS
Filed Sept. 11, 1931 2 Sheets-Sheet 1
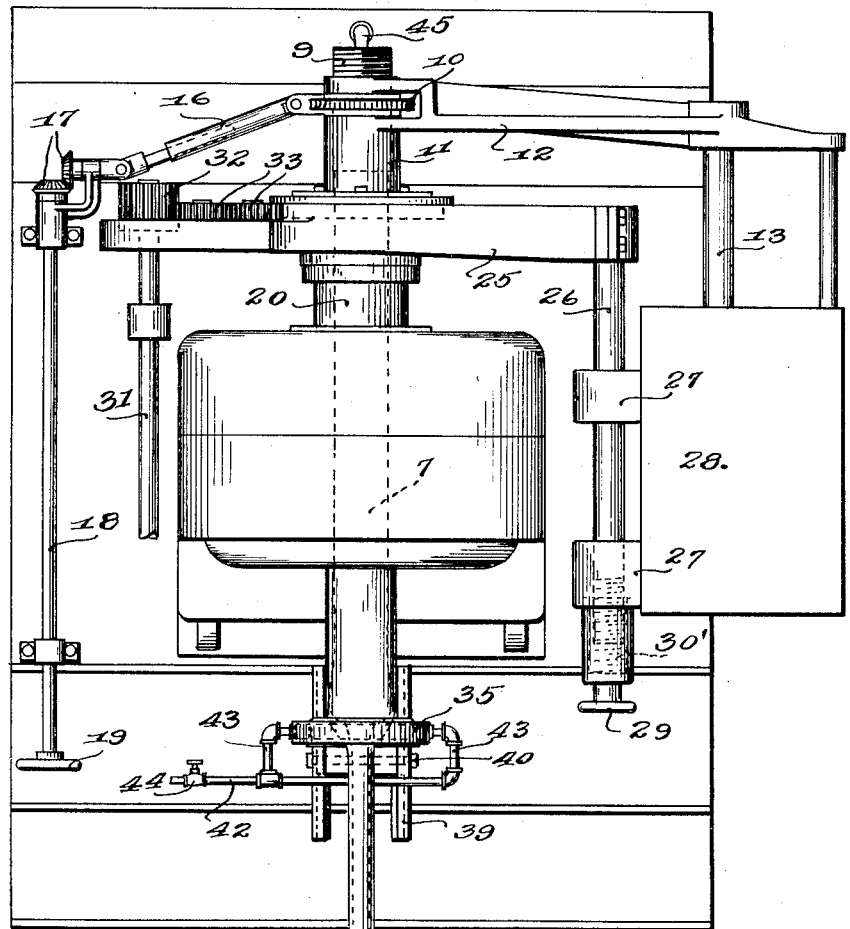
Fig. 1.
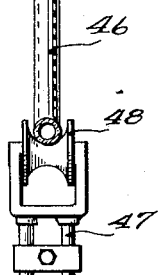
Inventor
Leonard D. Soubier
By J. F. Rule, Attorney

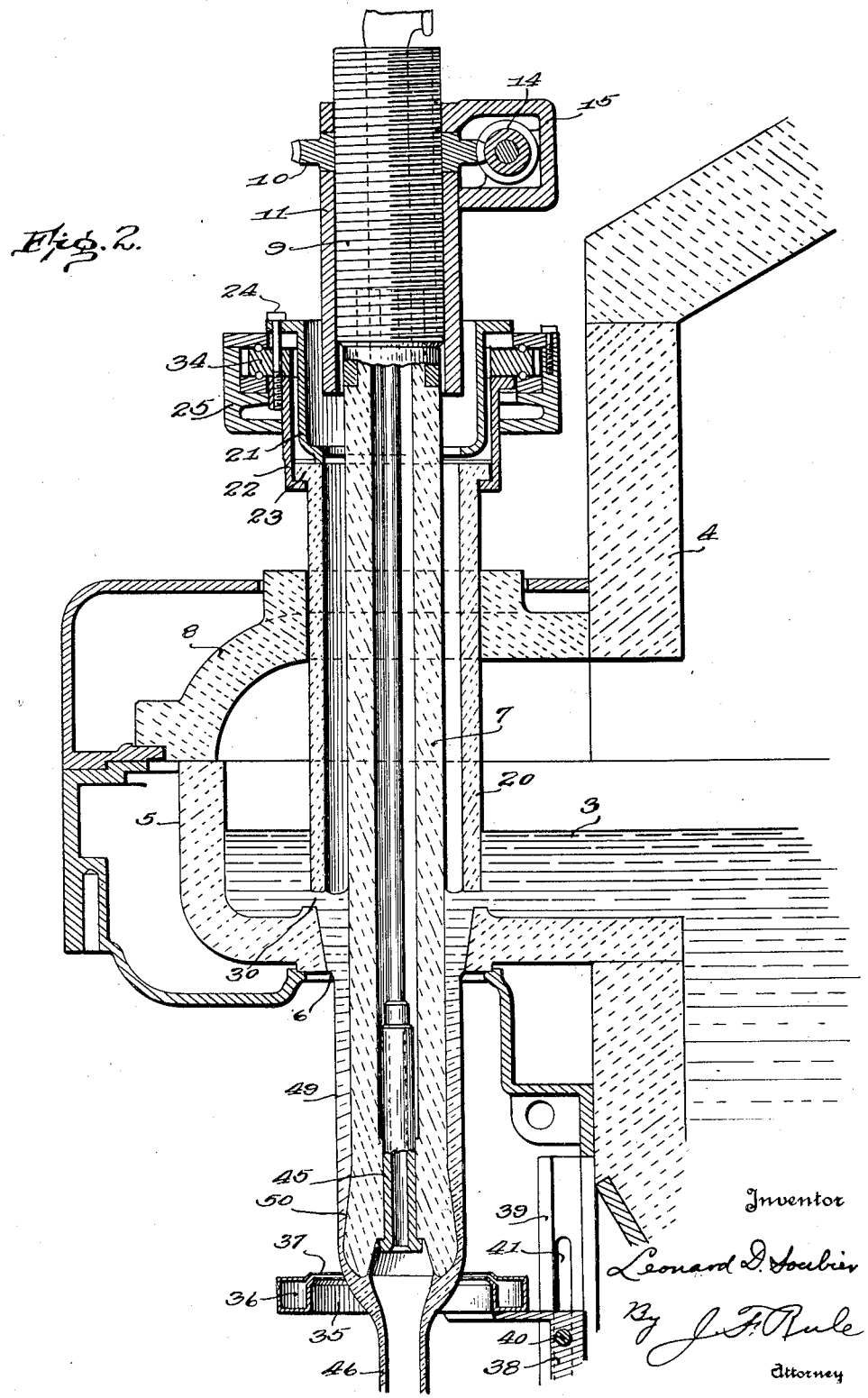

Patented Sept. 12, 1933

1,926,410

UNITED STATES PATENT OFFICE 1,926,410

APPARATUS FOR MAKING TUBULAR GLASS

Leonard D. Soubier, Woonsocket, R. I., assignor to Owens-Illinois Glass Company, a corporation of Ohio Application September 11, 1931
Serial No. 562,314

4 Claims. (Cl. 49—17.1)

My invention relates to apparatus for producing glass tubing by a continuous drawing process and is in the nature of an improvement on the apparatus disclosed, for example, in the patent granted to me February 2, 1926, Number 1,571,216.

An object of the present invention is to provide improved means for effectively and accurately regulatng and controlling the temperature of the glass as it is being given tubular form. In the formation of tubular glass by a method such as herein disclosed, in which the glass issuing from the furnace outlet is given tubular formation by means of a mandrel projecting through the outlet, it is necessary that a considerable drop in the temperature of the glass be obtained between the time the glass leaves the molten supply body and the completion of its formation into a tube of the desired size. There is ordinarily a drop of several hundred degrees during this period of transition, the extent of this reduction in temperature depending of course upon various conditions and the final results desired.

An object of the present invention is to provide adequate means for effecting this reduction in temperature and for accurately controlling such reduction.

A further object of the invention is to provide means external to the furnace for accurately controlling the rate at which the glass flows.

The invention further provides means for controlling the diameter of the tubing and the thickness of its walls.

Other objects of the invention will appear hereinafter.

In the accompanying drawings:

Fig. 1 is a front elevation of a tube forming apparatus embodying the present invention.

Fig. 2 is a sectional side elevation of the same.

Referring to the drawings, molten glass 3 is supplied from a furnace 4 having a forehearth extension 5 with a bottom outlet opening 6 through which the glass issues continuously. The issuing glass is given tubular formation by means of a mandrel 7 made of refractory material. The mandrel extends downward through the glass in the forehearth and centrally through the outlet 6 and forms with the walls of said outlet an annular passageway through which the glass issues and by which it is given its initial tubular formation. The mandrel 7 extends upward through an opening in the roof 8 of the forehearth, and at its upper end is attached to a metal head or tube 9 forming an extension of the mandrel. The tube 9 is externally screw threaded to receive a worm wheel 10 which is threaded thereon. The wheel 10 is journaled in a sleeve or casing 11 surrounding the tube 9, said sleeve being formed integral with a horizontal arm 12 fixed to a stationary post 13. The arm 12 thus forms a support for the mandrel 7. By rotating the worm wheel 10, the mandrel is adjustable up and down. Means for rotating the worm wheel 10 comprises a worm 14 journaled in a box 15 carried on the arm 12. Said worm is operatively connected through a flexible shaft 16 and gears 17 to a vertical rod 18 which carries a hand wheel 19 at the lower end thereof. By rotating the hand wheel, the mandrel may be adjusted vertically through a wide range of adjustment.

A stirring implement 20 is provided comprising a tube or sleeve of refractory material surrounding the mandrel and projecting downward into the glass in the forehearth. Said sleeve is attached at its upper end to a hollow head comprising inner and outer members 21 and 22, respectively, which engage the upper and lower faces of a flange or enlargement 23 formed at the upper end of the sleeve 20. Screws 24 connect the members 21 and 22 and cause them to grip said flange 23. Said head is mounted on the outer end of a horizontal arm 25 attached to a vertical rod 26 mounted for adjustment up and down in bearings 27 carried on a stationary support 28. A hand wheel 29 is attached to a screw threaded sleeve 30' engaging the correspondingly threaded lower end of the shaft 26. Rotation of the hand wheel 29 causes up and down movement of the shaft 26 and parts carried thereby, thus providing for vertical adjustment of the stirring implement. The lower end of the sleeve 20 is spaced a short distance above the floor of the forehearth, providing an annular passageway 30 through which the glass flows to the outlet 6. The rate of flow to the outlet 6 is controlled by the up and down adjustment of the sleeve 20 and by regulating the temperature of the glass.

Continuous rotation is imparted to the stirring implement by mechanism comprising a continuously rotating drive shaft 31 which carries a pinion 32 operating through a train of gears 33 to rotate a gear 34 mounted in the arm 25, concentric with the sleeve 20. The bolts 24 extend through holes in the gear 34 and thus provide a positive driving connection between said gear and the stirring implement 20.

An air cooling device is provided for supplying cooling air to the glass after it has issued from the outlet 6. This device comprises a hollow ring 35 surrounding the mandrel adjacent the lower end thereof and forming an annular air pressure chamber 36. A restricted air passage or nozzle 37 directs the air from the chamber 36 in an upwardly and inwardly inclined direction against the glass surrounding the mandrel. A blast of air in sheet form completely surrounding the mandrel is thus directed against and envelopes the glass. The blower 35 is attached to a head 38 mounted for vertical adjustment between stationary guide rails 39. A clamping bolt 40 extends through the head 38 and through slots 41 in the guide rails and provides means for clamping said head in adjusted position.

Air under pressure is continuously supplied to the blower through a pipe 42 having branch pipes 43 leading to the ring 35 at opposite sides thereof. The rate of flow of air may be regulated and controlled by a throttle valve 44.

Air is supplied as usual to the interior of the tubing as it is formed, by means of a pipe 45 extending throughout the length of the hollow mandrel. The glass tube 46 as it is formed is drawn over a supporting and guiding frame 47 including guide pulleys 48 which support the glass and control its direction of movement.

It will be observed that the mandrel 7 extends downward a considerable distance below the outlet 6 so that the portion 49 of glass in transition from its molten unformed condition within the furnace to its final tubular form, is flowing or moving along the surface of the mandrel through a considerable distance and for a substantial length of time. This gives opportunity for cooling the issuing glass to the extent necessary to control its flow and cause it to retain its shape when reduced to its final tubular form. It is found in practice that it is usually necessary to reduce the temperature of the glass through several hundred degrees between the time it leaves the forehearth and the time it is drawn off the lower end of the mandrel. By projecting the mandrel downward below the outlet as shown, such cooling is permitted and may be accurately controlled by vertical adjustment of the mandrel. The air from the blower 35 envelops the exposed glass and operates effectively on substantially the entire area of glass surrounding the mandrel below the outlet 6.

The lower portion of the mandrel 7 has its walls flared outwardly as shown at 50 so that its diameter is increased adjacent the lower end thereof. The walls of the surrounding glass are correspondingly decreased in thickness, as indicated on the drawings. It is found that by shaping the mandrel as just described, the rate of flow of the glass thereover is materially reduced and can be effectively controlled. By decreasing such enlargement of the lower end portion of the mandrel, it is found that the flow of glass is more rapid. Thus the rate of flow, extent of cooling and thickness of the tube may be regulated and controlled by varying the diameter of the enlargement 50.

As the glass flows downward from the outlet 6 there is a cooling and contraction of the glass which determines the thickness of the walls of the tube 46. It should be noted that with a given rate of flow of glass at the outlet, the length of that portion of the mandrel extending below the outlet, and its diameter, are all factors working together to determine the final result. It will be apparent that for a given rate of flow and temperature of glass at the outlet 6, the thickness of the tube walls will depend upon the rate at which the glass flows downward from the outlet 6 to the lower end of the mandrel. The blower 36 can be used as an auxiliary means of additional control and for offsetting or counteracting other conditions. For example, if the temperature of the glass is too high or the rate of flow more rapid than desired, an increased amount of air can be supplied through the blower 36 to counteract these conditions.

Modifications may be resorted to within the spirit and scope of my invention.

What I claim is:

1. Apparatus for continuously forming tubular glass comprising a container for molten glass having an outlet, a mandrel extending through said outlet and forming with the outlet an annular passageway through which the glass issues, said mandrel extending outwardly beyond the outlet and providing an exposed cylindrical surface over which the issuing glass flows in tubular form, and means for supplying a blast of cooling air at the outer end of and surrounding said exposed portion of the mandrel and the glass flowing thereover and directing said air toward the container outlet, causing the air to envelop and move over the entire said exposed portion.

2. Apparatus for continuously forming tubular glass comprising a container for molten glass having a bottom outlet, a mandrel extending through said outlet and forming with the outlet an annular passageway through which the glass issues, said mandrel extending downwardly beyond the outlet and providing an exposed cylindrical surface over which the issuing glass flows in tubular form, and means for supplying an annular blast surrounding the lower end of the mandrel and moving upward over said exposed surface thereof.

3. Apparatus for continuously forming tubular glass comprising a container for molten glass having an outlet, a mandrel extending through said outlet and forming with the outlet an annular passageway through which the glass issues, said mandrel extending outwardly beyond the outlet and providing an exposed cylindrical surface over which the issuing glass flows in tubular form, and cooling means comprising an air chamber and an annular nozzle connected with said chamber and surrounding the tube of glass which is being formed, said nozzle arranged to supply a blast of cooling air enveloping the glass and moving over the surface of said tubular formation of glass toward the container outlet.

4. Apparatus for continuously forming tubular glass comprising a container for molten glass having a bottom outlet, a mandrel extending through said outlet and forming with the outlet an annular passageway through which the glass issues, said mandrel extending downwardly beyond the outlet and providing an exposed cylindrical surface over which the issuing glass flows in tubular form, the walls of the mandrel being downwardly and outwardly flared from the lower end of said cylindrical surface and thence inwardly flared, thereby providing an exposed surface of larger diameter than said cylindrical surface, cooling means comprising an air chamber and an annular nozzle connected with said chamber and surrounding the tube of glass which is being formed, said nozzle being positioned at said enlarged portion of the mandrel and arranged to supply a blast of cooling air enveloping the glass and moving upwardly over said exposed cylindrical surface, and means for adjusting said nozzle up and down.

LEONARD D. SOUBIER.